(12) United States Patent
Hanson et al.

(10) Patent No.: US 8,724,850 B1
(45) Date of Patent: May 13, 2014

(54) SMALL OBJECT DETECTION USING MEANINGFUL FEATURES AND GENERALIZED HISTOGRAMS

(75) Inventors: Grant A. Hanson, Ridgecrest, CA (US); Steven B. Gorrono, Ridgecrest, CA (US); Douglas P. Lamb, Ridgecrest, CA (US); Michael S. Franklin, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 472 days.

(21) Appl. No.: 13/165,148

(22) Filed: Jun. 21, 2011

(51) Int. Cl.
*G06K 9/68* (2006.01)
*G06K 9/48* (2006.01)

(52) U.S. Cl.
USPC ............ 382/103; 382/171; 382/190; 345/474; 345/582

(58) Field of Classification Search
USPC ......... 382/103, 128, 132, 133, 226, 170, 171, 382/190, 224; 345/582, 474
See application file for complete search history.

(56) References Cited

U.S. PATENT DOCUMENTS

| | | | |
|---|---|---|---|
| 8,509,546 B1 * | 8/2013 | Flenner | 382/226 |
| 2008/0159591 A1 * | 7/2008 | Ruedin | 382/103 |

OTHER PUBLICATIONS

Arjuna Flenner, Gary A. Hewer, & Charles S. Kenney, "Two Dimensional Histogram A1 Analysis Using the Helmholtz Principle," American Inst. of Math. Sciences, Nov. 2008, V2, No. 4.*
U.S. Appl. No. 12/807,373, Flenner, Arjuna.
Agnes Desolneux, Lionel Moisan, Jean-Michel Morel, "Maximal Meaningful Events and Applications to Image Analysis"; Centre de Mathématiques et de Leurs Applications; 2000, Fran.
Julie Delon, Agnes Desolneux, Jose-Luis Lisani, "A non parametric theory for histogram segmentation"; Centre de Mathématiques et de Leurs Applications, Mar. 2005, France.
Stanley T. Birchfield, Sriam Rangarajan, "Spatiograms Versus Histograms for Region-Based Tracking"; IEEE Conference on CVPR, Jun. 2005, San Diego, CA.

* cited by examiner

*Primary Examiner* — Kim Vu
*Assistant Examiner* — Michael Vanchy, Jr.
(74) *Attorney, Agent, or Firm* — James M. Saunders

(57) ABSTRACT

A small object detection using meaningful features and generalized histograms includes providing at least one pixilated image. A region of interest is extracted from the pixilated image. A statistogram of the region of interest is generated. The statistogram is searched to determine at least one maximal meaningful interval of the region of interest. The maximal meaningful interval is output in a tangible medium.

17 Claims, 3 Drawing Sheets

SMALL OBJECT DETECTION USING MEANINGFUL FEATURES AND GENERALIZED HISTOGRAMS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a small target detection device, and more particularly, to a new paradigm using Helmholtz classification to detect small targets on an imaging infrared (IIR) Focal Plane Array (FPA).

Figure 1:
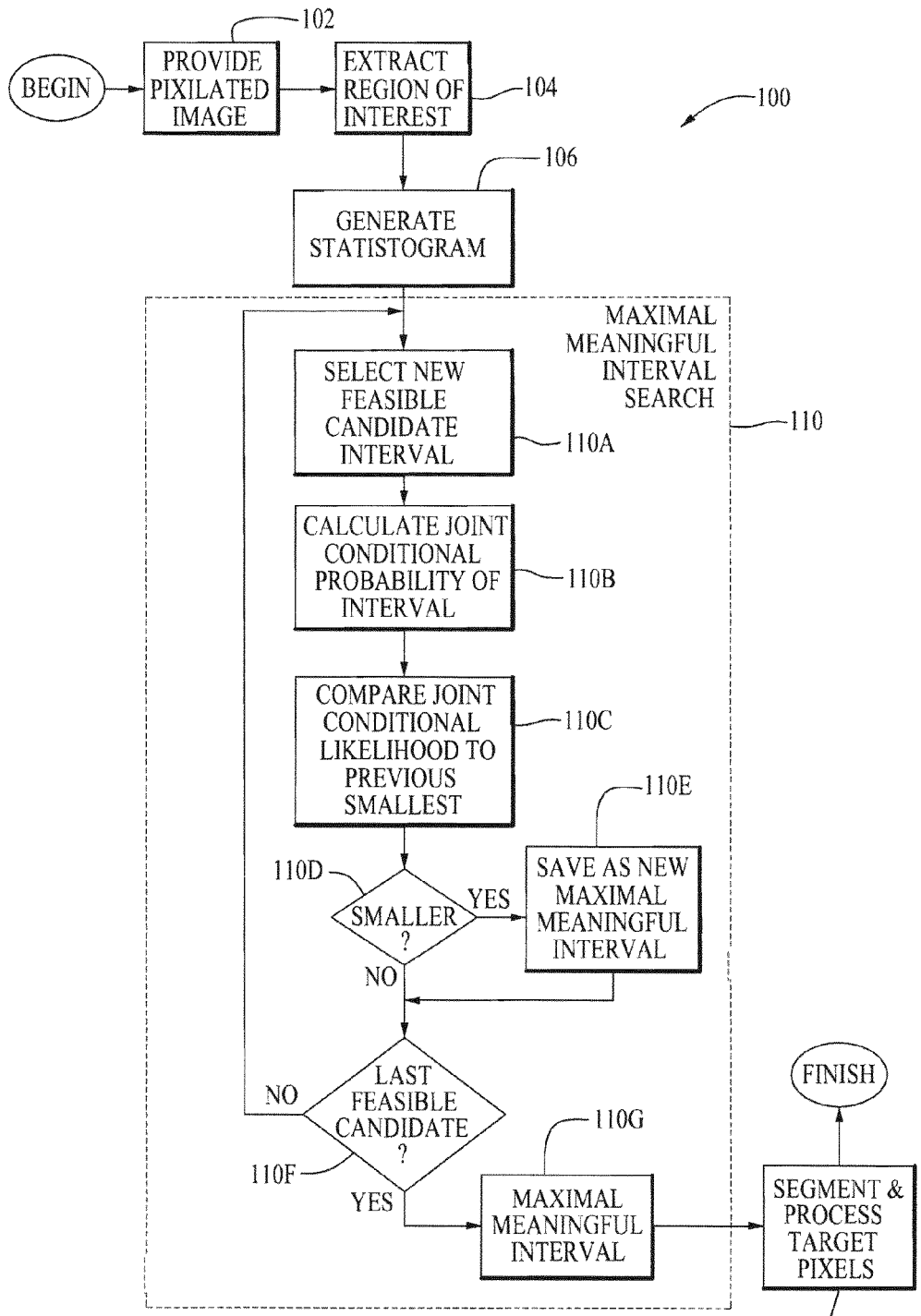
FIG. 1 is a block process diagram of a method for detecting small objects, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to a small target detection device, and more particularly, to a new paradigm using Helmholtz classification to detect small targets on an imaging infrared (IIR) Focal Plane Array (FPA) by searching a generalized histogram called a statistogram.

The statistogram incorporates multiple spatial statistics along with intensity information to allow discrimination based on joint occurrence of multiple statistically meaningful criteria. Using joint likelihood of multiple occurrences makes the detection much more robust than previous schemes. Statistical information includes, but is not limited to, intensity of pixels, spatial extent (or compactness) of a candidate set of pixels, and gradient magnitude and/or direction on the boundary of a collection of pixels.

Instead of the traditional bin-by-bin decisions made by a Bayes classifer, the Helmholtz classifier searches for a maximally meaningful interval, a contiguous range of intensity bins. The additional spatial statistics are stored in the statistogram for fast access. The statistics for an interval are calculated by aggregating the statistics of the individual bins. This technique is able to track small objects (objects having less than 10 pixels) and can search intervals instead of relying on a bin-by-bin search method.

Previous small target detection schemes have used a Bayes classifer, operating on histograms of intensity candidate pixels and neighboring pixels. Past methods made decisions on a bin-by-bin basis, which results in poor performance either because of sparse statistics or coarse quantization, which reduces sensitivity to low contrast targets.

Other researchers have used an extended histogram data structure called a spatiogram to associate spatial statistics to histogram intensity bins. Applications included matching and tracking of large features in image sequences. These methods did not use an interval search and did not attempt to track small objects such as, for example, objects less than ten pixels in size.

The introduced technique substantially improves previous published research of J. M. Morel who pioneered several significant gestalt-theoretic applications of detecting geometric structures in images using what, at the time, was called the Helmholtz principle. The previous Helmholtz principle employed earlier was defined such that an object is perceivable when its probability of occurrence in a random image is very small.

Earlier work in the area has been confined to simple histograms that have assumed a uniform model in their calculations. The introduced technique uses contextual information from the image itself to estimate statistical likelihoods. Furthermore, additional statistics are incorporated into the likelihood estimation using the statistogram.

Although embodiments of the invention are described in considerable detail, including references to certain versions thereof, other versions are possible. Examples of other versions include performing the tasks in an alternate sequence or hosting a program on a different platform. Therefore, the spirit and scope of the appended claims should not be limited to the description of versions included herein.

Embodiments of the invention may take the form of a computer program product on a computer-usable storage medium having computer-usable/readable program instructions embodied in the medium. Any suitable computer readable medium may be utilized including either computer readable storage mediums, such as, for example, hard disks, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instruction means that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements.

FIG. 1 illustrates a block process diagram of a method for detecting small objects, according to embodiments of the invention, depicted as reference character 100.

Embodiments of the invention generally relate to a method for detecting small objects using a computer, including: providing at least one pixilated image (task 102), extracting a region of interest from at least one pixilated image (task 104), generating a statistogram of the region of interest (task 106), and searching the statistogram to determine at least one maximal meaningful interval of the region of interest (task 110). Task 110 is shown in the dashed box and, as shown, includes tasks 110A through 110G. The method 100 includes outputting in a tangible medium at least one maximal meaningful interval (not shown in FIG. 1). At least one pixilated image is provided by a long wave infrared camera.

Figure 2A:
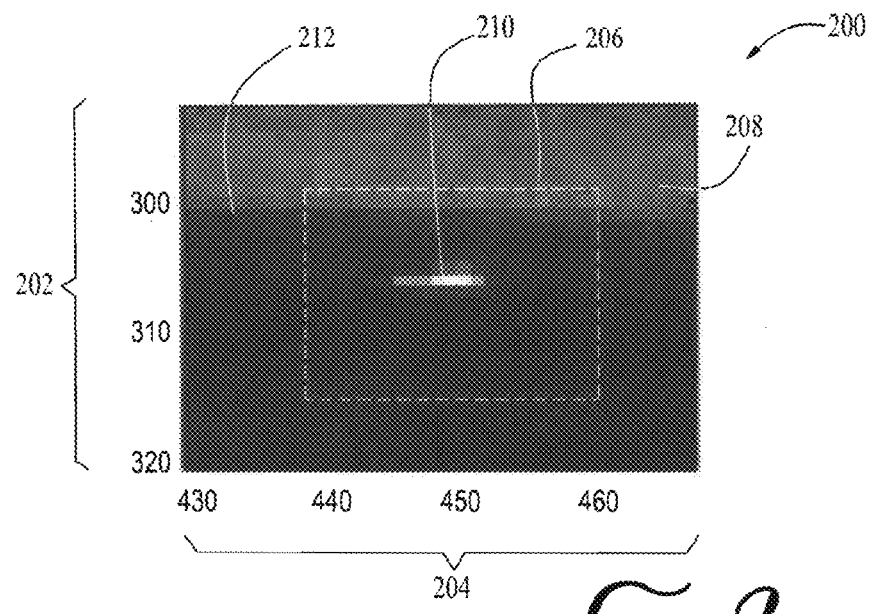
FIG. 2A is a schematic illustrating a region of interest in a pixilated image, according to embodiments of the invention.

FIG. 2A illustrates a region of interest in a pixilated image, according to embodiments of the invention, as depicted by reference character 200.

The region of interest 200 is a location in at least one pixilated image including at least one predicted target 210. The y-axis in FIG. 2A represents rows 202 corresponding to the region of interest in at least one pixilated image. The x-axis in FIG. 2A represents columns 204 corresponding to the region of interest 200 in at least one pixilated image. The region of interest 200 in FIG. 2A extracted from at least one pixilated image (task 104 in FIG. 1) shows the rows 202 and columns 204 from at least one pixilated image taken above the ocean by the long wave infrared camera.

The region of interest 200 includes a first rectangular patch 206 and a second rectangular patch 208 in at least one pixilated image. The first rectangular patch 206 is a window centered on at least one predicted target 210. In the scenario depicted in FIG. 2A, at least one predicted target 210 is a boat. Embodiments of the invention, however, are also applicable to land-based objects.

The window 206 is depicted as a dashed box. The second rectangular patch 208 is a frame surrounding the first rectangular patch 206. The frame 208 represents background data not associated with at least one predicted target 210.

The window 206 and frame 208 may also be referred to as a window region and frame region, respectively, without loss of generality or detracting from the merits of the invention.

FIG. 2A is shown in grayscale. At least one predicted target 210 is an object that an analyst would likely be interested in because it is statistically rare compared with the surrounding regions, and is depicted as white clusters. Additionally, a contrast region 212 appears as the area between light and dark. The contrast region 212 is the horizon.

Figure 2B:
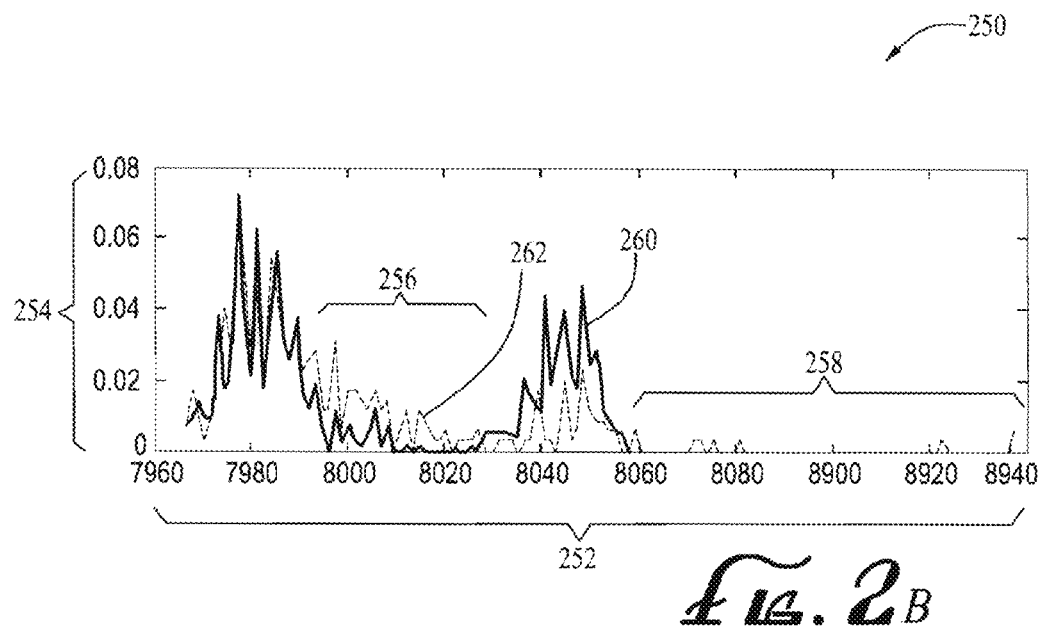
FIG. 2B is a schematic illustrating a statistogram depicting intensities associated with a window region associated in the region of interest, according to embodiments of the invention.

FIG. 2B illustrates a statistogram depicting intensities associated with a window region associated in the region of interest (200 in FIG. 2A), according to embodiments of the invention, depicted as reference character 250. Thus, FIG. 2B is an intermediate output depicting which intensities are likely to be targets based on data obtained from FIG. 2A.

The statistogram 250 is a generalized histogram data structure adapted to include calculated pixel statistical features in a plurality of bins associated with the window 206 (FIG. 2A) and the frame 208 (FIG. 2A). The x-axis 252 in FIG. 2B represents intensity values and the y-axis 254 represents the fraction of pixels in each bin. Thus, FIG. 2B will be understood by a person having ordinary skill in the art to be the probability of a random pixel in the respective rectangular patches having the intensity shown on the x-axis 252. Additional spatial and gradient statistics in the statistogram 250 are not shown, but are organized such that statistics for the collection of pixels in an intensity bin are located in corresponding bins in parallel data structures.

A solid line 260 in FIG. 2B represents background data from the frame 208 in FIG. 2A. A dashed line 262 in FIG. 2B represents data from the window 206 in FIG. 2A. Lower intensity values are shown as smaller peaks in FIG. 2B and indicate lower probabilities and are thus considered to be potentially significant for analysis.

The statistical representation of the horizon 212 in FIG. 2A is depicted as reference character 256 in FIG. 2B. The lowest fraction of pixels, however, represents at least one predicted target 210 (FIG. 2A) and is depicted as reference character 256. At least one predicted target 210 in FIG. 2A is depicted as reference character 258 in FIG. 2B. The interval 258 is shown to be approximately in the intensity range from 8060 to 8940. Thus, at least one predicted target 210 from FIG. 2A has the highest intensity range (the intensity values associated with reference character 258) and although in FIG. 2B it has the lowest fraction of pixels in each bin for the window region 206 (FIG. 2A) it has much higher fraction of pixels than the frame region 208 (FIG. 2A), and thus it has a very small conditional probability.

The calculated pixel statistical features include pixel intensities associated with each bin in the plurality of bins, pixel spatial arrangements associated with each bin in the plurality of bins, pixel minimum and maximum horizontal and vertical locations associated with each bin in the plurality of bins, behavior of horizontal and vertical gradients of each of at least one pixilated image about pixels corresponding to each bin in the plurality of bins, and joint behavior of gradients as a function of spatial extent associated with each bin in the plurality of bins.

The pixel spatial arrangements include maximum spatial extent in horizontal and vertical dimensions, sums of horizontal and vertical locations, sums of squares of horizontal and vertical locations, and sums of products of horizontal and vertical locations.

In FIG. 1, the generating a statistogram of the region of interest (task 106), further including calculating the pixel statistical features of the window and the frame, storing the calculated pixel statistical features in the plurality of bins associated with the statistogram, and organizing the calculated pixel statistical features in the plurality of bins associated with the statistogram.

At least one maximal meaningful interval is the set of pixels that fall into bins a through b, [a,b], whose occurrence is the least statistically probable of all possible intensity intervals.

The searching the statistogram to determine a maximal meaningful interval of the region of interest task (task 110) includes performing a set of maximal meaningful interval search tasks (tasks 110A through 110G) and an iteration of the set of maximal meaningful interval search tasks task. Task 110 is shown as a dotted box in FIG. 1.

The set of maximal meaningful interval search tasks (tasks 110A through 110G) including: initializing the set of pixels [a,b] to a single bin on the first iteration of the set of maximal meaningful interval search tasks task (not shown in FIG. 1), selecting a new feasible candidate interval [a,b] including at least one predicted target (task 110A), calculating joint conditional probability of the interval [a,b], P([a,b]), using the calculated pixel statistical features extracted from the statistogram (task 110B), comparing the joint conditional probability of the interval [a,b], P([a,b]), to the lowest previously calculated joint conditional probability, Pmin (task 110C), saving the candidate interval [a,b] as a new maximal meaningful interval [a,b] when the joint conditional probability of the interval [a,b], P([a,b]), is less than the lowest previously calculated joint conditional probability, Pmin, where when the joint conditional probability of the interval [a,b], P([a,b]), is less than the lowest previously calculated joint conditional probability, Pmin, the joint conditional probability of the interval [a,b], P([a,b]), is further defined as the lowest previously calculated joint conditional probability, Pmin, for subsequent iterations of the set of maximal meaningful interval search tasks (shown together as tasks 110D and 110E).

Tasks 110A through 110E are iterated through until all feasible candidate intervals have been tested (task 110F). This determination is automatically performed. Thus, once a maximal meaningful search has completed, it is possible to repeat the search to find another maximal meaningful interval that does not overlap the previous maximal meaningful interval.

The joint conditional probability of the interval [a,b], P([a,b]), is determined by a statistical model employing a probability distribution function that represents the statistical features of the frame. When the calculated pixel statistical features of the window occur more often than the calculated pixel statistical features of the frame, the set of pixels [a,b] have a low conditional probability and are considered meaningful and are classified as a feasible candidate interval [a,b].

The feasible candidate interval [a,b] occurs when the conditional probability of the window pixels in endpoint bins a and b is small, which is the case when the probability of the window pixels in endpoints a and b is higher than the probability of the frame pixels in the respective endpoints a and b. Thus, the window pixels occur at higher rate than predicted by the statistical model using the frame region.

The new maximal meaningful interval [a,b] is labeled as a target interval. The outputting in a tangible medium of at least one maximal meaningful interval includes segmenting and processing the target interval into target pixels (task 112).

Output includes hard copy printouts, other computer accessible medium such as computer hard drives or floppy discs, visual display screens, as well as other mediums employing identified target intervals.

Figure 3:
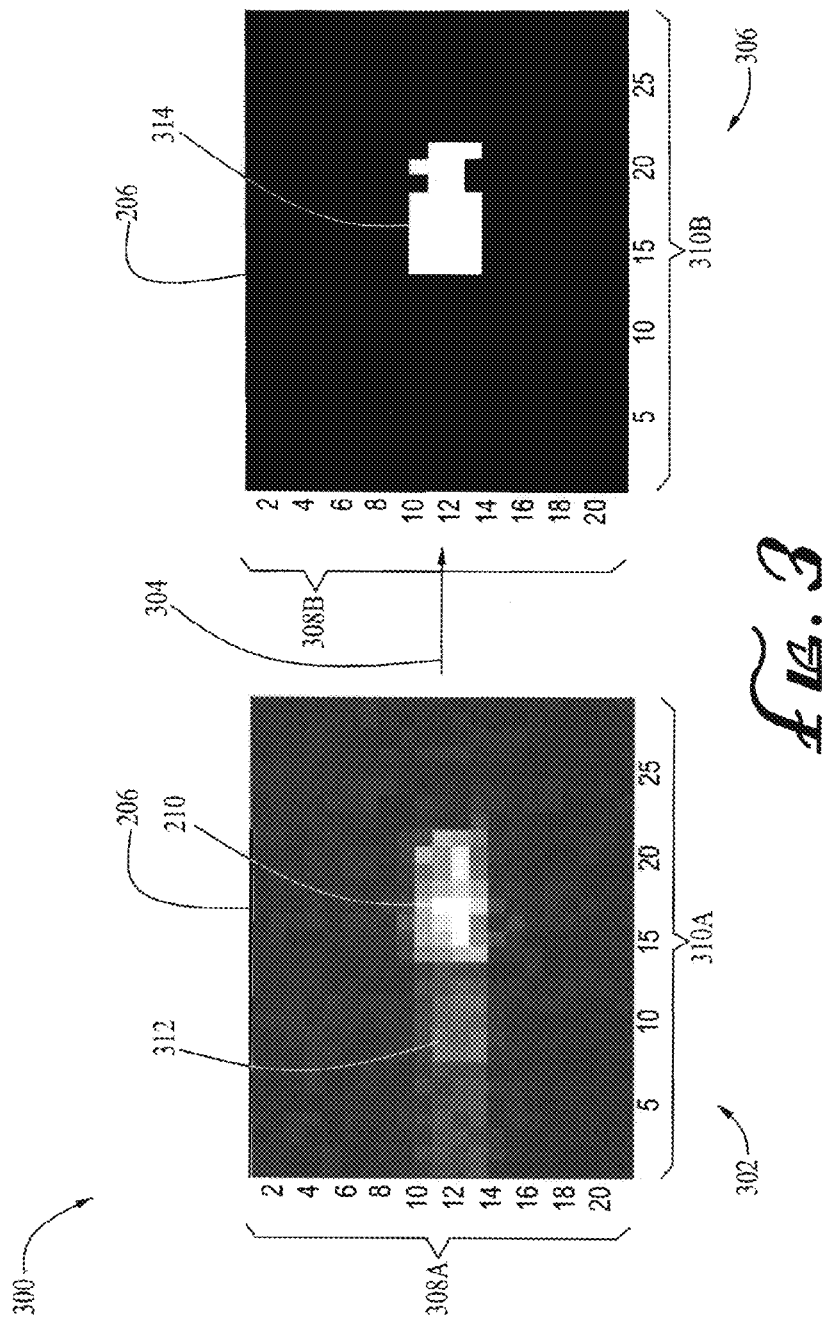
FIG. 3 is a schematic illustrating a comparison of raw data and processed data associated with a target, according to embodiments of the invention.

FIG. 3 shows a comparison of raw data and processed data associated with a target, according to embodiments of the invention. The comparison is depicted as reference character 300. The raw data is depicted as reference character 302, a processing function (an arrow) as reference character 304, and the processed data as reference character 306.

FIG. 3 is shown in grayscale and has two images. The raw data 302 is from the window 206 (FIG. 2A) centered on at least one predicted target 210 (FIG. 2A). The processed data 306 is commonly referred to as a processed image.

Rows in both the raw data 302 and processed data 306 are depicted as 308A and 308B, respectively. Similarly, columns in both the raw data 302 and processed data 306 are depicted as 310A and 310B, respectively. The boat 210 from FIG. 2A has an associated wake 312 depicted as darker gray clusters.

In embodiments, stationary and moving objects may be detected. Thus, movement of at least one predicted target 210 is not required. As such, embodiments of the invention can detect stationary objects such as, for example, boats anchored on water bodies and stationary land-based objects.

The processed image 306 shows a cluster of white pixels 314 that are determined to be a target (the boat 210 after processing) because their intensities fall between the endpoints of the maximal meaningful interval and are segmented. A person having ordinary skill in the art will understand that segmented means classifying each pixel in the window region 206 (FIG. 2A) as a target or not a target.

Another embodiment of the invention includes an article of manufacturing having stored thereon a plurality of computer executable instructions. At least one extracting instruction that, when executed by a computer, causes the computer to extract a region of interest from at least one pixilated image.

The region of interest is a location in at least one pixilated image including at least one predicted target. The region of interest includes a first rectangular patch and a second rectangular patch in at least one pixilated image. The first rectangular patch is a window centered on at least one predicted target. The second rectangular patch is a frame surrounding the first rectangular patch. The frame represents background data not associated with at least one predicted target.

At least one statistogram generating instruction that, when executed by a computer, causes the computer to generate a statistogram of the region of interest. The statistogram is a generalized histogram data structure adapted to include calculated pixel statistical features in a plurality of bins associated with the window and the frame. The calculated pixel statistical features include pixel intensities associated with each bin in the plurality of bins, pixel spatial arrangements associated with each bin in the plurality of bins, pixel minimum and maximum horizontal and vertical locations associated with each bin in the plurality of bins, behavior of horizontal and vertical gradients of each of at least one pixilated image about pixels corresponding to each bin in the plurality of bins, and joint behavior of gradients as a function of spatial extent associated with each bin in the plurality of bins.

At least one calculating instruction that, when executed by a computer, causes the computer to calculate the pixel statistical features of the window and the frame.

At least one storing instruction that, when executed by a computer, causes the computer to store the calculated pixel statistical features in the plurality of bins associated with the statistogram.

At least one organizing instruction that, when executed by a computer, causes the computer to organize the calculated pixel statistical features in the plurality of bins associated with the statistogram.

At least one statistogram searching instruction that, when executed by a computer, causes the computer to search the statistogram to determine at least one maximal meaningful interval of the region of interest.

At least one maximal meaningful interval search instruction that, when executed by a computer, causes the computer to perform a set of maximal meaningful interval search tasks and an iteration of the set of maximal meaningful interval search tasks task.

The set of maximal meaningful interval search tasks includes at least one initialization instruction that, when executed by a computer, causes the computer to initialize the set of pixels [a,b] to a single bin on the first iteration of the set of maximal meaningful interval search tasks task.

At least one selection instruction that, when executed by a computer, causes the computer to select a new feasible candidate interval [a,b] including at least one predicted target.

At least one joint conditional probability calculating instruction that, when executed by a computer, causes the computer to calculate joint conditional probability of the interval [a,b], P([a,b]), using the calculated pixel statistical features extracted from the statistogram.

At least one comparing instruction that, when executed by a computer, causes the computer to compare the joint conditional probability of the interval [a,b], P([a,b]), to the lowest previously calculated joint conditional probability, Pmin.

At least one saving instruction that, when executed by a computer, causes the computer to save the candidate interval [a,b] as a new maximal meaningful interval [a,b] when the joint conditional probability of the interval [a,b], P([a,b]), is less than the lowest previously calculated joint conditional probability, Pmin. When the joint conditional probability of the interval [a,b], P([a,b]), is less than the lowest previously calculated joint conditional probability, Pmin, the joint conditional probability of the interval [a,b], P([a,b]), is further defined as the lowest previously calculated joint conditional probability, Pmin, for subsequent iterations of the set of maximal meaningful interval search tasks.

At least one iterating instruction that, when executed by a computer, causes the computer to iterate through: the selecting a new feasible candidate interval [a,b] including at least one predicted target instruction; the calculating joint conditional probability of the interval [a,b], P([a,b]), using the calculated pixel statistical features extracted from the statistogram instruction; the comparing the joint conditional probability of the interval [a,b], P([a,b]), to the lowest previously calculated joint conditional probability, Pmin instruction; the saving the candidate interval [a,b] as a new maximal meaningful interval [a,b] when the joint conditional probability of the interval [a,b], P([a,b]), is less than the lowest previously calculated joint conditional probability, Pmin and when the joint conditional probability of the interval [a,b], P([a,b]), is less than the lowest previously calculated joint conditional probability, Pmin, the joint conditional probability of the interval [a,b], P([a,b]), is further defined as the lowest previously calculated joint conditional probability, Pmin instruction, until all feasible candidate intervals have been tested.

A readable storage device having computer readable program code stored thereon, where the computer readable program code includes computer executable instructions.

At least one outputting instruction that, when executed by a computer, causes the computer to output in a tangible medium at least one maximal meaningful interval.

At least one pixilated image is provided by a long wave infrared camera.

The pixel spatial arrangements include sums of horizontal and vertical locations, sums of squares of horizontal and vertical locations, and sums of products of horizontal and vertical locations.

At least one maximal meaningful interval is the set of pixels that fall into bins a through b, [a,b], whose occurrence is the least statistically probable of all possible intensity intervals.

The joint conditional probability of the interval [a,b], P([a,b]), is determined by a statistical model employing a probability distribution function that represents the statistical features of the frame. When the calculated pixel statistical features of the window occur more often than the calculated pixel statistical features of the frame, the set of pixels [a,b] have a low conditional probability and are considered meaningful and are classified as a feasible candidate interval [a,b].

The feasible candidate interval [a,b] occurs when the conditional probability of the window pixels in endpoint bins a and b is small, which is the case when the probability of the window pixels in endpoints a and b is higher than the probability of the frame pixels in the respective endpoints a and b. Thus, the window pixels occur at higher rate than predicted by the statistical model using the frame region.

Another embodiment of the invention generally relates to a target locator, including: a device that extracts at least one region of interest from at least one pixilated image, a device that generates a statistogram of the region of interest, a device that determines a target interval of at least one region of interest by searching the statistogram, and a device that outputs in a tangible medium pixels associated with the target interval. The device is a computer.

A person having ordinary skill in the art will recognize that the concept of maximally meaningful events provides a method of scoring candidate hypotheses. Similarly, bins are recognized as memory locations that are the data structure associated with a statistogram. The bins count tallies and the number of pixels having particular statistical characteristics.

Furthermore, the statistogram and plurality of bins are stored in electronic memory components of a computer. Moreover, it is understood that a distribution function is the mapping of variables to probabilities.

Thus, the Helmholtz paradigm developed classifies image pixels based on statistically meaningful features and generalized histograms. Therefore, a framework is produced for a general family of classifiers that can be used to detect small objects in imagery.

The baseline algorithm operates on histograms of intensity for window and frame regions. Histograms are computed on data from both regions into histogram p, describing the frame region, and histogram r, describing the window region. Histogram p is assumed to have been normalized so that it sums to 1, and therefore is an approximation of the intensity probability distribution function in the frame region. The r histogram has also been normalized. N is the number of pixels in the window region. A variable k=rN, denotes the number of samples in a bin or interval [a,b] in histogram r such as, for example, the number of counts that were in the bins before normalization.

The baseline algorithm searches the r histogram for intervals [a,b] (a range of adjacent bins starting at bin a and ending at bin b) whose contents are maximally meaningful (have lowest conditional probability or likelihood of occurrence) given that p governs the distribution. The definition of a maximally meaningful interval is one whose likelihood is lower than any subset interval it includes and lower than any superset interval that includes it. Maximally meaningful intervals exist when distribution r is different from p.

For any interval [a,b], r([a,b]) is the sum of all the histogram bins from a to b, and k =N r([a,b]) is the number of counts or pixels whose intensities are between a and b. In practical implementation, a and b are integer bin numbers that are associated with certain intensity values, rather than the intensities themselves. For simplicity of notation a shorthand r is generally used, rather than writing out r([a,b]), and it is understood that the calculation of the likelihood of a particular interval is being performed.

For any interval [a,b], the likelihood of obtaining at least k=Nr samples can be estimated given that p is the actual probability distribution function of intensity (p(a) determines the probability of a single pixel having an intensity falling in bin a). This is a binomial tail, which has an upper bound in the form of an entropy function.

Thus, the baseline algorithm is of the form:

$$P(\text{at least } k \text{ out of } N \mid p) =$$
$$P(k \text{ out of } N \mid p) + P(k+1 \text{ out of } N \mid p) + \ldots + P(N \text{ out of } N \mid p) =$$
$$\binom{N}{k} p^k (1-p)^{N-k} + \binom{N}{k+1} p^{k+1} (1-p)^{N-k-1} + \ldots + \binom{N}{N} p^N =$$
$$\sum_{j=k}^{N} \binom{N}{j} p^j (1-p)^{N-j} = \beta(N, k, p) \le e^{-NH(r,p)}$$

Where H(r,p) is the mutual entropy function.

This is the probability of a specific interval [a,b] that exceeded a threshold number of counts, k. The Helmholtz strategy is to use this calculated quantity as a detection statistic, by comparing it to a threshold that is chosen to keep the false alarm rate sufficiently small. Specifically, given a number, $\tau$, the probability of a false alarm is made (declaring a target present when the data is just random noise) less than or equal to $\tau$, by choosing k such that the probability that random data obeying distribution p will produce k or more counts in any interval is less than $\tau$.

When the histograms have L bins, then there are L(L+1)/2 possible intervals to be tested. Therefore the probability of some interval exceeding the chosen threshold is approximately:

$$\frac{L(L+1)}{2} e^{-NH(r,p)}$$

This first version uses a single statistical feature, intensity, to estimate the likelihood of occurrence.

Enhancements to the baseline algorithm employ additional statistical features, by expanding the histogram to a statistogram. The statistogram data structure starts with a histogram, but incorporates multiple additional feature structures that each have the same number of fields as the histogram has bins. These fields are used to characterize the statistical behavior of the pixels whose intensities fall in corresponding histogram bins.

An example of this extension uses horizontal and vertical spatial extent of pixels corresponding to histogram intervals. The statistogram has fields that store the minimum and maximum horizontal and vertical locations of the set of pixels that fill each histogram bin. With this information, it can be quickly determined, for any interval [a,b], the size of the smallest bounding box that includes all the pixels in that interval. The joint probability of k or more pixels occurring and all of them being clustered in a box of area A, can be computed as follows:

$$P(k \text{ or more out of } N,$$
$$\text{and all } K \text{ or more contained in a box of area } A \mid p) \stackrel{\text{def}}{=}$$
$$P\left(\frac{k \text{ or more}}{N} \wedge k \text{ or more} \in A \mid p\right) =$$
$$P\left(\frac{k}{N} \wedge k \in A \mid p\right) + P\left(\frac{k+1}{N} \wedge k+1 \in A \mid p\right) + \ldots + P\left(\frac{A}{N} \wedge A \in A \mid p\right) =$$
$$\sum_{j=k}^{A} \binom{A}{j} p^j (1-p)^{N-j} = (1-p)^{N-A} \beta(A, k, p) \le (1-p)^{N-A} e^{-AH\left(\frac{k}{A}, p\right)}$$

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for detecting small objects using a computer, comprising:
   providing at least one pixilated image;
   extracting a region of interest from said at least one pixilated image, wherein said region of interest is a location in said at least one pixilated image including at least one predicted target, wherein said region of interest comprises a first rectangular patch and a second rectangular patch in said at least one pixilated image, wherein said first rectangular patch is a window centered on said at least one predicted target, wherein said second rectangular patch is a frame surrounding said first rectangular patch, wherein said frame represents background data not associated with said at least one predicted target;
   generating a statistogram of said region of interest, wherein said statistogram is a generalized histogram data structure configured to include calculated pixel statistical features in a plurality of bins associated with said window and said frame, where said calculated pixel statistical features include pixel intensities associated with each bin in said plurality of bins, pixel spatial arrangements associated with each bin in said plurality of bins, pixel minimum and maximum horizontal and vertical locations associated with each bin in said plurality of bins, behavior of horizontal and vertical gradients of each of said at least one pixilated image about pixels corresponding to each bin in said plurality of bins, and joint behavior of gradients as a function of spatial extent associated with each bin in said plurality of bins;

wherein said pixel spatial arrangements include sums of horizontal and vertical locations, sums of squares of horizontal and vertical locations, and sums of products of horizontal and vertical locations;

searching said statistogram to determine at least one maximal meaningful interval of said region of interest; and outputting in a tangible medium said at least one maximal meaningful interval.

2. The method according to claim 1, wherein said at least one pixilated image is provided by a long wave infrared camera.

3. The method according to claim 1, wherein said generating a statistogram of said region of interest, further comprising;

calculating said pixel statistical features of said window and said frame;

storing said calculated pixel statistical features in said plurality of bins associated with said statistogram; and organizing said calculated pixel statistical features in said plurality of bins associated with said statistogram.

4. The method according to claim 3, wherein said at least one maximal meaningful interval is the set of pixels that fall into bins a through b, [a,b], whose occurrence is the least statistically probable of all possible intensity intervals.

5. The method according to claim 4, further comprising performing a set of maximal meaningful interval search tasks and an iteration of said set of maximal meaningful interval search tasks.

6. The method according to claim 5, further comprising:

initializing the set of pixels [a,b] to a single bin on the first iteration of said set of maximal meaningful interval search tasks task;

selecting a new feasible candidate interval [a,b] including said at least one predicted target;

calculating joint conditional probability of said interval [a,b], P([a,b]), using said calculated pixel statistical features extracted from said statistogram;

comparing said joint conditional probability of said interval [a,b], P([a,b]), to the lowest previously calculated joint conditional probability, Pmin;

saving said candidate interval [a,b] as a new maximal meaningful interval [a,b] when said joint conditional probability of said interval [a,b], P([a,b]), is less than the lowest previously calculated joint conditional probability, Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability, Pmin, for subsequent iterations of said set of maximal meaningful interval search tasks; and iterating through said selecting a new feasible candidate interval [a,b] including said at least one predicted target task, said calculating joint conditional probability of said interval [a,b], P([a,b]), using said calculated pixel statistical features extracted from said statistogram task, said comparing said joint conditional probability of said interval [a,b], P([a,b]), to the lowest previously calculated joint conditional probability, Pmin task, and said saving said candidate interval [a,b] as a new maximal meaningful interval [a,b] when said joint conditional probability of said interval [a,b], P([a,b]), is less than the lowest previously calculated joint conditional probability, Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability, Pmin, for subsequent iterations of said set of maximal meaningful interval search tasks, until all feasible candidate intervals have been tested.

7. The method according to claim 6, wherein said joint conditional probability of said interval [a,b], P([a,b]), is determined by a statistical model employing a probability distribution function that represents the statistical features of said frame, wherein when said calculated pixel statistical features of said window occur more often than said calculated pixel statistical features of said frame, said set of pixels [a,b] having a low conditional probability and are considered meaningful and are classified as a feasible candidate interval [a,b].

8. The method according to claim 6, further comprising labeling said new maximal meaningful interval [a,b] as a target interval.

9. The method according to claim 8, further comprising segmenting and processing said target interval into target pixels.

10. An article of manufacture comprising a non-transitory computer-readable medium having stored thereon a plurality of computer executable instructions, comprising:

at least one extracting instruction that, when executed by a computer, causes said computer to extract a region of interest from at least one pixilated image, wherein said region of interest is a location in said at least one pixilated image including at least one predicted target, wherein said region of interest comprises a first rectangular patch and a second rectangular patch in said at least one pixilated image, wherein said first rectangular patch is a window centered on said at least one predicted target, wherein said second rectangular patch is a frame surrounding said first rectangular patch, wherein said frame represents background data not associated with said at least one predicted target;

at least one statistogram generating instruction that, when executed by a computer, causes said computer to generate a statistogram of said region of interest, wherein said statistogram is a generalized histogram data structure configured to include calculated pixel statistical features in a plurality of bins associated with said window and said frame, wherein said calculated pixel statistical features include pixel intensities associated with each bin in said plurality of bins, pixel spatial arrangements associated with each bin in said plurality of bins, pixel minimum and maximum horizontal and vertical locations associated with each bin in said plurality of bins, behavior of horizontal and vertical gradients of each of said at least one pixilated image about pixels corresponding to each bin in said plurality of bins, and joint behavior of gradients as a function of spatial extent associated with each bin in said plurality of bins;

at least one calculating instruction that, when executed by a computer, causes said computer to calculate said pixel statistical features of said window and said frame;

at least one storing instruction that, when executed by a computer, causes said computer to store said calculated pixel statistical features in said plurality of bins associated with said statistogram;

at least one organizing instruction that, when executed by a computer, causes said computer to organize said calculated pixel statistical features in said plurality of bins associated with said statistogram;

at least one statistogram searching instruction that, when executed by a computer, causes said computer to search said statistogram to determine at least one maximal meaningful interval of said region of interest;

at least one maximal meaningful interval search instruction that, when executed by a computer, causes said computer to perform a set of maximal meaningful interval search tasks and an iteration of said set of maximal meaningful interval search tasks;

at least one initialization instruction that, when executed by a computer, causes said computer to initialize the set of pixels [a,b] to a single bin on the first iteration of said set of maximal meaningful interval search tasks task:

at least one selection instruction that, when executed by a computer, causes said computer to select a new feasible candidate interval [a,b] including said at least one predicted target;

at least one joint conditional probability calculating instruction that, when executed by a computer, causes said computer to calculate joint conditional probability of said interval [a,b], P([a,b]), using said calculated pixel statistical features extracted from said statistogram;

at least one comparing instruction that, when executed by a computer, causes said computer to compare said joint conditional probability of said interval [a,b], P([a,b]), to the lowest previously calculated joint conditional probability, Pmin;

at least one saving instruction that, when executed by a computer, causes said computer to save said candidate interval [a,b] as a new maximal meaningful interval [a,b] when said joint conditional probability of said interval [a,b], P([a,b]), is less than the lowest previously calculated joint conditional probability. Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability. Pmin, for subsequent iterations of said set of maximal meaningful interval search tasks;

at least one iterating instruction that, when executed by a computer, causes said computer to iterate through said selection instruction that, when executed by a computer, causes said computer to select a new feasible candidate interval [a,b] including, said at least one predicted target instruction, said joint conditional probability calculating instruction that, when executed by a computer, causes said computer to calculate joint conditional probability of said interval [a,b], P([a,b]), using said calculated pixel statistical features extracted from said statistogram instruction, said comparing instruction that, when executed by a computer, causes said computer to compare said joint conditional probability of said interval [a,b], P([a,b]), to the lowest previously calculated joint conditional probability, Pmin instruction, and said at least one saving instruction that, when executed by a computer, causes said computer to save said candidate interval [a,b] as a new maximal meaningful interval [a,b] when said joint conditional probability of said interval [a,b], P([a,b]), is less than the lowest previously calculated joint conditional probability, Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability, Pmin, for subsequent iterations of said set of maximal meaningful interval search tasks instructions, until all feasible candidate intervals have been tested; and at least one outputting instruction that, when executed by a computer, causes said computer to output in a tangible medium said at least one maximal meaningful interval.

11. The article of according to claim 10, wherein said at least one pixilated image is provided by a long wave infrared camera.

12. The article of manufacture according to claim 10, wherein said pixel spatial arrangements include sums of horizontal and vertical locations, sums of squares of horizontal and vertical locations, and sums of products of horizontal and vertical locations.

13. The article of manufacture according to claim 10, wherein said at least one maximal meaningful interval is the set of pixels that fall into bins a through b, [a,b], whose occurrence is the least statistically probable of all possible intensity intervals.

14. The article of manufacture according to claim 10, wherein said joint conditional probability of said interval [a,b], P([a,b]), is determined by a statistical model employing a probability distribution function that represents the statistical features of said frame, wherein when said calculated pixel statistical features of said window occur more often than said calculated pixel statistical features of said frame, said set of pixels [a,b] have a low conditional probability and are considered meaningful and are classified as a feasible candidate interval [a,b].

15. A method, using a computer, for determining at least one maximal meaningful interval in a region of interest, wherein said region of interest is a location in at least one pixilated image including at least one predicated target, wherein the at least one maximal meaningful interval is the set of pixels falling into bins a through b, [a,b], whose occurrence is the least statistically probable of all possible intensity intervals, comprising;

generating it statistogram of a region of interest, wherein said region of interest is a location in at least one pixilated image including at least one predicated target;

searching said statistogram for a maximal meaningful interval by performing a set of maximal meaningful interval search tasks and an iteration of said set of maximal meaningful interval search tasks;

initializing a set of pixels [a,b] to a single bin on the first iteration of said set of maximal meaningful interval search tasks task;

selecting a new feasible candidate interval [a,b] including said at least one predicted target;

calculating joint conditional probability of said interval [a,b], P([a,b]);

comparing said joint conditional probability of said interval [a,b], P([a,b]), to the lowest previously calculated joint conditional probability, Pmin;

saving said candidate interval [a,b] as a new maximal meaningful interval [a,b] when said joint conditional probability of said interval [a,b], P([a,b]), is less than the lowest previously calculated joint conditional probability, Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability, Pmin, for subsequent iterations of said set of maximal meaningful interval search tasks; and iterating through said selecting a new feasible candidate interval [a,b] including said at least one predicted target task, said calculating joint conditional probability of said interval [a,b], P([a,b]), using said calculated pixel statistical features extracted from said statistogram task, said comparing said joint conditional probability of said interval [a,b], P([a,b]), to the lowest previously calculated joint conditional probability, Pmin task, and said saving said candidate interval [a,b] as a new maximal meaningful interval [a,b] when said joint conditional probability of said interval [a,b], P([a,b]), is less than the lowest previously calculated joint conditional probability, Pmin, wherein when said joint conditional probability of said interval [a,b], P([a,b]), is less than the lowest previously calculated joint conditional probability, Pmin, said joint conditional probability of said interval [a,b], P([a,b]), is defined as the lowest previously calculated joint conditional probability, Pmin, for subsequent iterations of said set of maximal meaningful interval search tasks, until all feasible candidate intervals have been tested.

16. The method according to claim 15, said calculating joint conditional probability of said interval [a,b], P([a,b]), task, further comprising said region of interest having a first rectangular patch and a second rectangular patch in said at least one pixilated image, wherein said first rectangular patch is a window centered on said at least one predicted target, wherein said second rectangular patch is a frame surrounding said first rectangular patch, wherein said frame represents background data not associated with said at least one predicted target, wherein said statistogram is generalized histogram data structure configured to included calculated statistical features including pixel intensities associated with each bin in said plurality of bins, pixel spatial arrangements associated with each bin in said plurality of bins, pixel minimum and maximum horizontal and vertical locations associated with each bin in said plurality of bins, behavior of horizontal and vertical gradients of each of said at least one pixilated image about pixels corresponding to each bin in said plurality of bins, and joint behavior of gradients as a function of spatial extent associated with each bin in said plurality of bins, wherein said pixel spatial arrangements include sums of horizontal and vertical locations, sums of squares of horizontal and vertical locations, and sums of products of horizontal and vertical locations.

17. The method according to claim 15, wherein said joint conditional probability of said interval [a,b], P([a,b]), is determined by a statistical model employing a probability distribution function that represents the statistical features of said frame, wherein when said calculated pixel statistical features of said window occur more often than said calculated pixel statistical features of said frame, said set of pixels [a,b] having a low conditional probability and are considered meaningful and are classified as a feasible candidate interval [a,b].

* * * * *